United States Patent [19]

Boardman et al.

[11] Patent Number: 5,505,256

[45] Date of Patent: *Apr. 9, 1996

[54] HEAT EXCHANGERS AND METHODS OF MANUFACTURE THEREOF

[75] Inventors: James E. Boardman; John O. Fowler, both of Lancashire, England

[73] Assignee: Rolls-Royce plc, London, England

[ * ] Notice: The term of this patent shall not extend beyond the expiration date of Pat. No. 5,385,204.

[21] Appl. No.: 412,210

[22] Filed: Mar. 27, 1995

Related U.S. Application Data

[63] Continuation of Ser. No. 285,735, Aug. 4, 1994, abandoned, which is a continuation of Ser. No. 118,089, Sep. 8, 1993, Pat. No. 5,385,204, which is a continuation-in-part of Ser. No. 766,788, Sep. 27, 1991, which is a division of Ser. No. 657,377, Feb. 19, 1991, Pat. No. 5,070,607.

[51] Int. Cl.$^6$ ........................................ F28F 3/14
[52] U.S. Cl. ........................... 165/166; 29/890.042
[58] Field of Search .................... 165/166, 170; 29/890.042

[56] References Cited

U.S. PATENT DOCUMENTS

| | | |
|---|---|---|
| Re. 25,619 | 7/1964 | Adams . |
| 2,553,030 | 5/1951 | Bell . |
| 2,596,008 | 5/1952 | Collins . |
| 2,766,514 | 10/1956 | Adams . |
| 2,845,695 | 8/1958 | Grenell . |
| 2,859,509 | 11/1958 | Adams . |
| 2,999,306 | 9/1961 | Baxter . |
| 3,024,002 | 3/1962 | Beck . |
| 3,067,492 | 12/1962 | Johnson . |
| 3,108,361 | 10/1963 | Neel . |
| 3,136,037 | 6/1964 | Solnick et al. . |
| 3,180,011 | 4/1965 | Heuer . |
| 3,194,309 | 7/1965 | Adams . |
| 3,205,563 | 9/1965 | Pauls et al. . |
| 3,271,846 | 9/1966 | Buechele et al. . |
| 3,291,206 | 12/1966 | Nicholson . |
| 3,297,082 | 1/1967 | Tranel et al. . |
| 3,348,290 | 10/1967 | Broverman et al. . |
| 3,408,723 | 11/1968 | Myers . |
| 3,458,917 | 8/1969 | Mueller . |
| 3,895,436 | 7/1975 | Summers et al. . |
| 3,924,793 | 12/1975 | Summers et al. . |
| 3,927,817 | 12/1975 | Hamilton et al. . |
| 4,120,351 | 10/1978 | Kleine et al. . |
| 4,220,276 | 9/1980 | Weisert et al. . |
| 4,303,570 | 12/1981 | Weisert et al. . |
| 4,351,470 | 9/1982 | Swadling et al. . |
| 4,396,057 | 8/1983 | Berntell et al. . |
| 4,422,569 | 12/1983 | Payne et al. . |
| 4,534,503 | 8/1985 | Stephen et al. . |
| 4,607,783 | 8/1986 | Mainsbridge et al. . |
| 4,632,296 | 12/1986 | Mainsbridge et al. . |
| 4,820,355 | 4/1989 | Bampton . |

FOREIGN PATENT DOCUMENTS

| | | |
|---|---|---|
| 602644 | 8/1960 | Canada . |
| 0130583 | 1/1985 | European Pat. Off. . |
| 0161892 | 5/1986 | European Pat. Off. . |
| 0358523 | 3/1990 | European Pat. Off. . |

(List continued on next page.)

OTHER PUBLICATIONS

RRA Leaflet (undated).
Article in "Chemical Engineer", Dec. 1986, pp. 36–38.
AGARD–LS–154 "Superplasticity" Sep. 1987.

*Primary Examiner*—Allen J. Flanigan
*Attorney, Agent, or Firm*—Cushman Darby & Cushman

[57] ABSTRACT

It is common practice to assemble heat exchangers from a multitude of pre-formed and sometimes extremely delicate pieces. The pieces have to be held in jigs along with appropriately placed braze material and then heated to achieve brazing. The invention takes advantage of the ability which some materials have, to considerably extend their areas without rupturing, by using such materials in that they are assembled in the flat condition and then diffusion bonded, followed by inflation of the parts of the assembly which are to provide the fluid passageways, inlet manifolds and headers. The construction of heat exchangers is thus considerably simplified.

7 Claims, 12 Drawing Sheets

FOREIGN PATENT DOCUMENTS

| | | |
|---|---|---|
| 0356142 | 11/1990 | European Pat. Off. |
| 808844 | 2/1937 | France . |
| 3104919 | 12/1981 | Germany . |
| 205038 | 1/1968 | U.S.S.R. . |
| 2203068 | 10/1968 | United Kingdom . |
| 1238491 | 7/1971 | United Kingdom . |
| 1378421 | 12/1974 | United Kingdom . |
| 1398929 | 6/1975 | United Kingdom . |
| 1415510 | 11/1975 | United Kingdom . |
| 1429054 | 3/1976 | United Kingdom . |
| 1480168 | 7/1977 | United Kingdom . |
| 1495655 | 12/1977 | United Kingdom . |
| 1541241 | 2/1979 | United Kingdom . |
| 2030480 | 4/1980 | United Kingdom . |
| 1565092 | 4/1980 | United Kingdom . |
| 2067532 | 7/1981 | United Kingdom . |
| 2069391 | 8/1981 | United Kingdom . |
| 2071547 | 9/1981 | United Kingdom . |
| 2087774 | 6/1982 | United Kingdom . |
| 2095137 | 9/1982 | United Kingdom . |
| 2124520 | 2/1984 | United Kingdom . |
| 2129340 | 5/1984 | United Kingdom . |
| 2135219 | 8/1984 | United Kingdom . |
| 2144656 | 3/1985 | United Kingdom . |
| 2150866 | 7/1985 | United Kingdom . |
| 2155822 | 10/1985 | United Kingdom . |
| 2158121 | 11/1985 | United Kingdom . |
| 2173511 | 11/1986 | United Kingdom . |

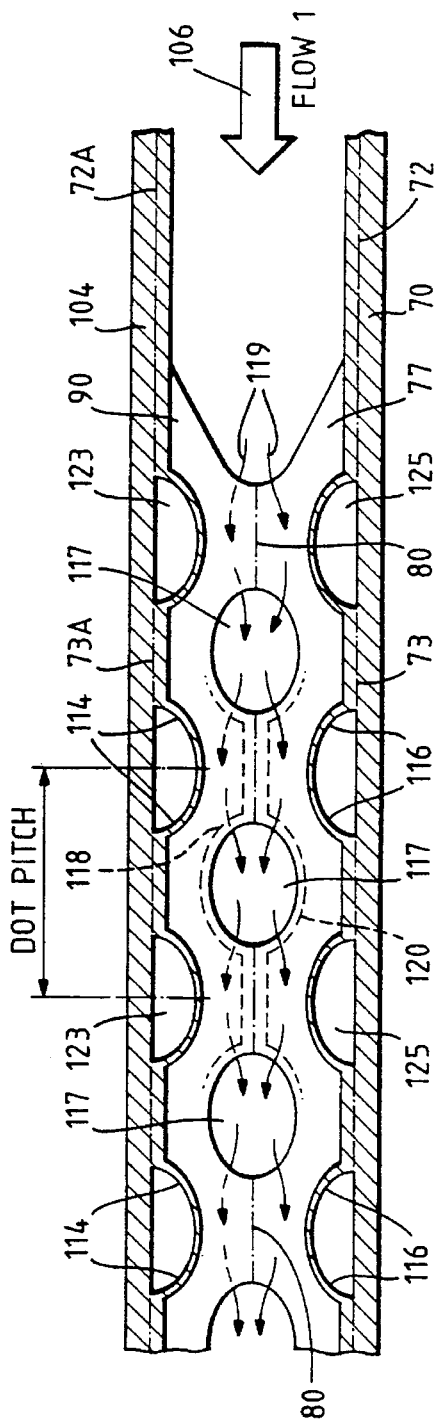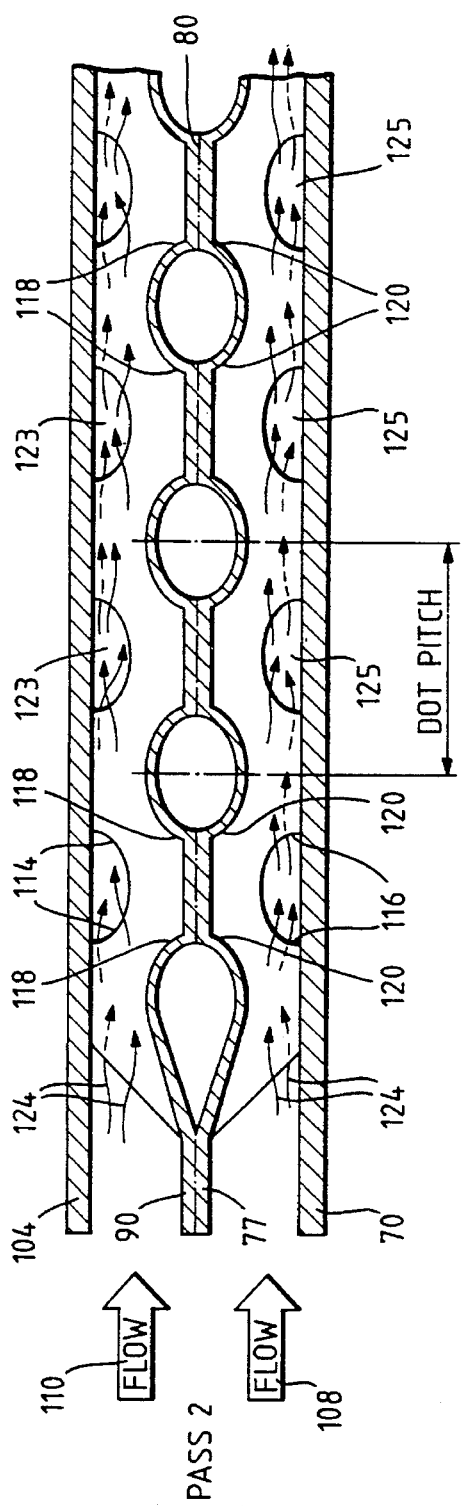

HEAT EXCHANGERS AND METHODS OF MANUFACTURE THEREOF

This is a continuation of application Ser. No. 08/285,735, filed on Aug. 4, 1994, which was abandoned upon the filing hereof which is a continuation of application Ser. No. 08/118,089, filed Sep. 8, 1993, now U.S. Pat. No. 5,385,204, which is a continuation-in-part of application Ser. No. 07/766,788, filed Sep. 27, 1991, which is a division of application Ser. No. 07/657,377, filed Feb. 19, 1991, now U.S. Pat. No. 5,070,607.

This invention relates to heat exchangers of the kind generally known as plate-fin heat exchangers, as opposed to the shell-tube type. The fluid passages in plate-fin heat exchangers are defined by partitions of a metal which has a satisfactorily high coefficient of heat transfer, so that when a high temperature fluid is passed through some passages and low temperature fluid is passed through further passages which are adjacent thereto, there results a cooling of the originally high temperature fluid, by heat conduction through the thickness of the partitions into the cool fluid. Efficiency of heat exchange is boosted by inclusion in the fluid flow passages of so-called "fins", which may in fact be corrugated members, dimples or protuberances instead of fins as such.

Such heat exchangers are conventionally constructed by sub-assembling a multitude of parts and welding or brazing them in a progressive manner until finally a complete structure is achieved. Examples of these heat exchangers are disclosed in a 1983 publication entitled "Compact Heat Exchangers" by R. L. Webb, and obtainable from the British Library at Boston Spa, Yorkshire.

Problems with this prior approach include the complexity and cost of the fabrication process and the difficulty of providing a structure with assured integrity due to the large number of brazed or welded joints inherent in its construction.

Attempts have been made to find alternative ways of manufacturing plate-fin heat exchanger elements which avoid the above problems. For instance, patent number GB2067532A describes a method in which metal sheets are stacked together and selectively diffusion bonded to each other before being superplastically deformed to a final hollow shape defining internal passages.

The present invention seeks to provide a heat exchanger with improved structural integrity. The invention also seeks to provide an improved method of manufacturing heat exchangers with high structural integrity.

According to one aspect of the present invention a heat exchanger comprises at least two sheets of metal, at least one of the sheets being capable of superplastic extension, the sheets having been joined together by diffusion bonding in selected places, said at least one sheet having been superplastically expanded away from the at least one other sheet in selected places where they are not diffusion bonded together thereby defining main heat exchanger passages for fluid flow, and also header means and manifold means in peripheral portions of the sheets, the header means and manifold means extending transverse of the main heat exchanger passage means to deliver fluid thereto and collect it therefrom.

According to a further aspect of the present invention a heat exchanger manufacturing method comprises the steps of a) selecting a plurality of metal sheets for stacking together, at least one of the sheets being capable of superplastic extension, b) applying anti-diffusion-bonding substance to at least one of the sheets in a predetermined pattern thereon, the predetermined pattern defining subsequent internal structure of the heat exchanger panel comprising heat exchanger passage means, header means and outlet manifold means, said header and outlet manifold means extending transverse of the heat exchanger passage means to deliver fluid thereto and collect it therefrom, c) stacking the metal sheets together, pipe means being inserted between the sheets during stacking in order to connect with the predetermined pattern of anti-diffusion-bonding substance, d) sealing the stack of sheets around its periphery so as to deny entry of atmospheric air or other fluids to the interior of the stack except through the pipe means, e) evacuating the interior of the stack through the pipe means and sealing the pipe means to isolate the interior from atmospheric contamination, f) positioning the stack within a heatable pressurisable vessel and applying heat and pressure across the stack thickness to diffusion bond the sheets together where there is no anti-diffusion-bonding substance therebetween, the sheets being only adhesively bonded together where the anti-diffusion-bonding substance is present, g) cooling the resulting integral stack to ambient temperature, h) judiciously feeding pressurised inert gas into the integral stack through the pipe means such that it permeates between the laying faces of the sheets throughout the whole extent of the internal structure defined by the anti-diffusion-bonding substance, i) continuing to pressurise the interior of the integral stack until the adhesive bond between the sheets throughout the whole extent of the internal structure defined by the anti-diffusion-bonding substance is broken by inflation of the structure within the elastic limits of the sheets, j) evacuating the interior of the integral stack through the pipe means, and k) heating the integral stack and then internally pressurising it to produce the heat exchanger passage means, the header means and the manifold means by superplastic extension of at least one of the sheets in at least some of the places where diffusion bonding has not occurred.

In a case where superplastic extension of one or both of the outer sheets of the integral stack occurs, the integral stack should be sandwiched between top and bottom dies of predetermined shape such that when superplastic extension of the outer sheet(s) occurs, it engages the die surface and is constrained to conform to the die shape without excessive thinning of the sheet due to the superplastic extension.

Preferably, the integral stack is sandwiched between the top and bottom dies before the final evacuation step, spaces between the outer sheets of the integral stack and the top and bottom dies also being evacuated before the final heating and pressurisation step.

For maximum integrity of the finished article, the final evacuation, heating and internal pressurisation steps should take place in an evacuated vessel such as an autoclave. Again for maximum integrity, the interior of the integral stack should be purged of contaminants by an inert gas immediately before the interior of the integral stack is evacuated subsequent to breaking of the adhesive bond.

Assuming that the anti-diffusion-bonding or "stop off" material is initially in the form of a liquid coating when applied to the sheet or sheets, it is likely that after the stack of sheets has been sealed around its periphery, the coating will still contain the solvent vehicle for the stop-off material. To prevent this from contaminating later stages of the process, we prefer to put the stack in an autoclave or similar and heat the stack until the solvent has been "baked out" and exhausted through the pipe means.

After cooling and before breaking of the adhesive bond between the sheets, the integral stack may conveniently be machined externally to a desired shape.

Further aspects of the invention will be apparent from a perusal of the following description and claims.

The invention will now be described, by way of example only and with reference to the accompanying drawings in which:

FIGS. 1a to 1c inclusive illustrate steps in the process of forming a heat exchanger panel in accordance with one aspect of the present invention.

FIGS. 2 to 4 inclusive are illustrations of heat exchanger panel forms achievable by the present invention.

FIG. 13 is a view on line 13—13 of FIG. 12.

FIG. 14 is a view on line 14—14 of FIG. 12.

Figure 1A:
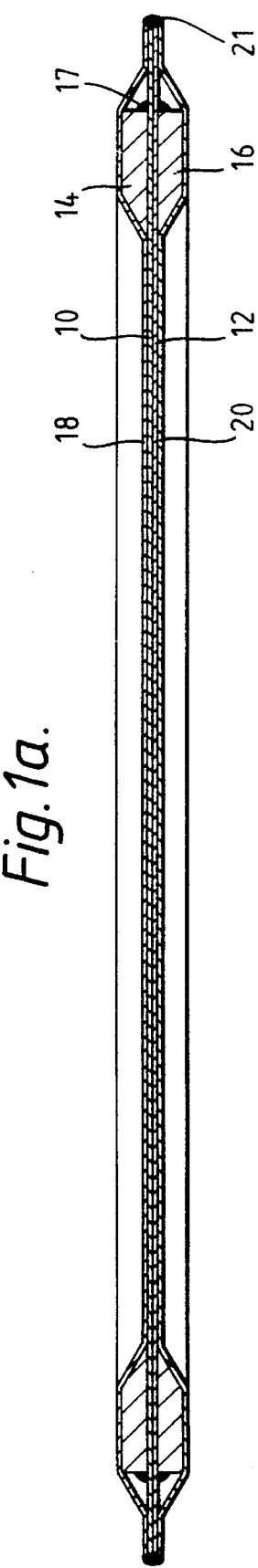
Figure 1B:
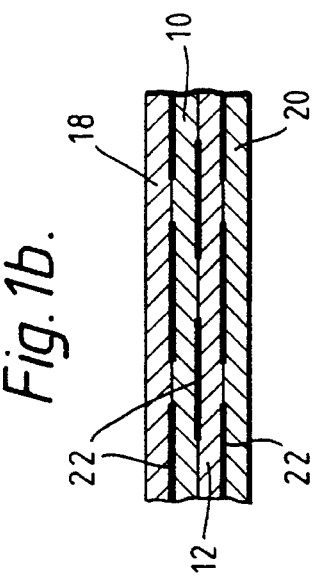
Figure 1C:
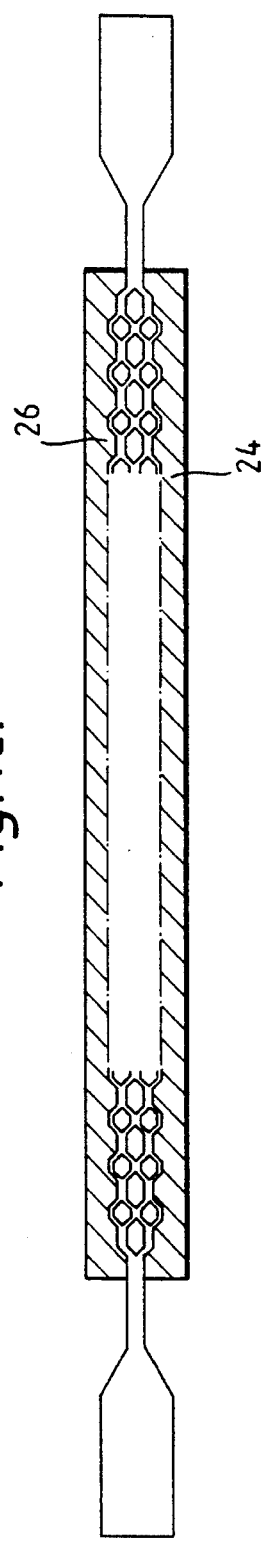

Referring to FIGS. 1a to 1c. In FIG. 1a, two sheets of titanium 10 and 12 are placed together so as to trap an end of a pipe (not shown) therebetween in a groove or slot in one or both of the sheets. The pipe (not shown) is positioned so as to project from between the two sheets.

Prior to placing the sheets 10 and 12 together, one of them has had a pattern of stop off material applied to its faying face. The stop off may comprise powdered yttria in a binder and solvent e.g. the stop off known as "Stopyt 62A" which is sold by GTE Service Corporation of 100 Endicott Street, Danvers, Mass. 01923, U.S.A. The groove or slot in which the pipe rests connects to the pattern of stop off material.

The stop off material is applied in a desired pattern by the known silk screen printing process that will ensure that eventually the sheets 10 and 12 can be separated at the places of application of the stop off, as will be described later in this specification.

In this particular embodiment of the invention a pair of titanium frames 14 and 16 are placed one each side of the faying sheets 10 and 12 and are welded thereto at 17 around their exterior peripheries.

The titanium frames 14,16 are only needed for one particular form of construction of heat exchanger. They are thicker than the rest of the finished panel will be after expansion by superplastic forming, their purpose being that during diffusion bonding they become unitary with the sheets 10,12,18 and 20 where they are in contact and thereby form a raised rim around the periphery of the finished heat exchanger panel. Any desired number of panels can then be easily stacked and diffusion bonded, welded or brazed together at their rims to form the finished heat exchanger matrix.

After welding of the frames to the sheets 10 and 12, further sheets 18 and 20 are then laid over the topside and underside of the assembly respectively. Prior to positioning of the sheets 18 and 20, further stop off material is applied to the exteriors of the sheets 10 and 12, again to provide selected non bonding areas of metal. During assembly, further piping (not shown) is fitted between sheets 10 and 18 and between sheets 12 and 20, these pipes also connecting to the stop off material. In the design of the assembly it is ensured that all areas of stop off material are connected to the piping through other contiguous areas of stop off material, and/or through slots in the thicknesses of the sheets.

On completion of the assembly in the manner described it is welded about its periphery at 21 so as to be sealed except for the inlets provided by the piping (not shown). The assembly is placed in an autoclave and heated so as to "bake out" the solvent from the stop off material and which has enabled the stop Off to be spread through the silk screen.

Thereafter, the interior of the assembly is evacuated via the pipe (not shown) and the pipe sealed.

The assembly is replaced in the autoclave and heated to about 925° C. The argon pressure in the autoclave is raised to about 3001 bs/sq.in (approximately 21 kg/Sq.cm) and held at that temperature for about two hours. The temperature and pressure are then reduced to ambient and the assembly removed, diffusion bonding having been achieved in those areas where no stop off is present.

Cracking is the next step, wherein highly pressurised argon is introduced through the piping into the area containing the stop off, in order to break the adhesive bond between the stop-off and the metal sheets which the diffusion bonding pressure has brought about.

Cracking is achieved at this point in the process because the metal is elastic at room temperature and the minimal extension which occurs does not go beyond the elastic limit. Consequently, the structure regains its shape when pressure is removed at the end of the step.

If cracking is attempted whilst the structure is at the common diffusion bonding and superplastic forming temperature, there is serious risk of progressive plastic deformation lengthwise of the structure, rather than the preferred mode of simultaneous deformation over the whole. In the former circumstances, rupture frequently occurs.

The argon is carefully introduced through the pipes to those areas which contain the stop off and proceeds to seep through the stop off and eventually reaches the opposing end of the structure.

The gas may initially be caused to travel along one side only of each sheet and on reaching the opposing end return to the inlet end via a slot and another of the layers of stop off. In any event, the need is to ensure that the gas travels the whole length of the interior of the structure before internal pressure becomes such as to break the adhesion between the stop off and the sheets which results from the applied pressure during the diffusion bonding step.

Referring briefly to FIG. 1b. The short, thick black lines 22 between the faying faces of the sheets 18,10,12 and 20 represent the patterns of stop off material of the particular example being described, which enables a final form to be achieved and which will now be described with reference to FIG. 1c.

To complete the forming of the structure into a heat exchanger panel, the structure is placed within appropriately shaped split dies 24 and 26 and the whole is positioned within an autoclave which is then evacuated so as to avoid contamination of the titanium structure. Spaces defined by the inner walls of the die and the outer surface of the structure are also reduced to zero pressure for reasons which are explained hereinafter.

The die and structure are again heated to a temperature of about 925° C. and then argon is introduced to the interior of the structure as described hereinbefore i.e. between the adjacent sheets 18 and 10 and between the sheets 12 and 20, so as to force the sheets apart in the areas which include the stop off and to force the parted portions of the outer sheets 18 and 20 into the respective die halves 22 and 24. The corresponding portions of the inner sheets 10 and 12 pull away from each other and because the gas pressure is the same on both sides of sheets 10 and 12, the sheet portions thereof which are being deformed will adopt the same shape as those portions of sheets 18 and 20 i.e. the shape of the die halves 22 and 24. Despite the lack of eventual support by way of a die surface for the sheets 10 and 12, there will be no tendency of the resulting hollow forms to balloon or to be crushed. This would not be the case for the outer sheets 18 and 20 since they are moving through a vacuum until such time as they contact the walls of the dies, the shape of which as previously stated they then adopt.

The magnitude of the movement of all of the sheets during deformation, is such as to require superplastic extension to occur. The term "superplastic" is a standard term in the metal forming art and will not be described herein.

In order to achieve superplastic forming without rupturing the thinning metal the gas is introduced in a series of constant volume pulses, at a pre-calculated rate which will achieve a desired strain rate, as is taught at pp. 615–623 in the book "The Science, Technology and Application of Titanium", edited by R. I. Jaffe and N. E. Promisel, published by Pergamon Press in 1970, which is hereby incorporated by reference. The method ensures that the titanium is subjected to that strain rate which will achieve the maximum permissible speed of extension at any given point in the procedure. The rate of application of the gas pulses may thus vary during expansion of the sheets.

Again as taught in the publication mentioned above, the argon can be introduced in a continuous, but varying rate of flow so chosen as to ensure that the appropriate strain rate is applied to the titanium. The inventors of this present invention however, have found that a pulsed flow wherein the pulses of gas are of identical volume, enables easier achievement of the desired strain rate.

On completion of forming, the inert atmosphere and the gas pressure within the structure is maintained whilst the structure is cooled to room temperature. The structure is then removed from the autoclave and the piping removed, and is then ready for fitting to the fluid supplies which in operation will be in heat exchange relationship within the structure.

Figure 2:
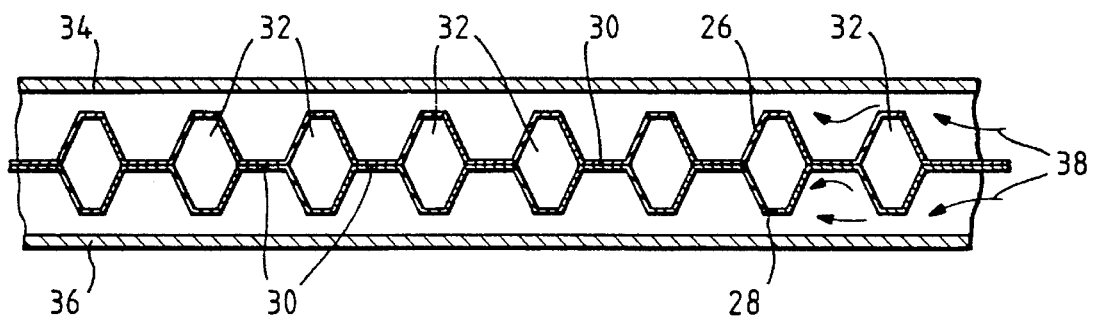

Referring to FIG. 2. Two sheets of titanium 26 and 28 have been diffusion bonded in local areas 30 and have had stop off applied in the remaining areas so as to prevent diffusion bonding there. The two sheets 26 and 28 have then been superplastically expanded away from each other to form spaced, hexagonal cross-section tubes 32, which extend lengthwise into the plane of the paper. A pair of side walls 34 and 36 are fixed by any convenient means in spaced relationship with respective sides of the tubes 32. For example, the sheets 26,28 may be provided with frames like the frames 14,16 in FIG. 1a and the side walls may be bonded to the frames.

In use, a hot fluid may be caused to flow through the tubes 32 and a cold fluid caused to flow in the spaces between the sidewalls 34 and 36 and the tubes, preferably crossflow in a direction normal to the lengths of the tubes 32, as is indicated by the arrows 38. This latter flow experiences great turbulence by virtue of it flowing over what is effectively an undulating surface. The cooling efficiency is thereby enhanced.

Figure 3:
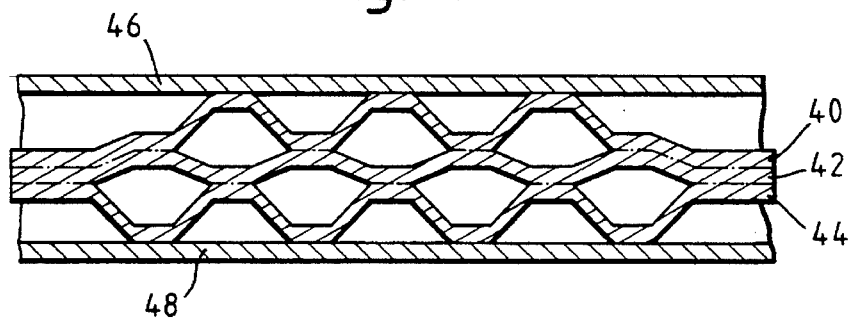

FIG. 3 depicts a panel constructed as described hereinbefore in connection with the present invention, but utilising three sheets 40,42 and 44. The interfaces between the sheets are indicated by chain dotted lines because, as happens in all true diffusion bonded joints, the passage of atoms from faying sheets across the interface obliterates the interfaces completely.

In the example of FIG. 3, side walls 46 and 48 are diffusion bonded to the hexagonal tubes which have been formed by the local separation of the sheets 40 and 42 and 42 and 44. This arrangement restricts the direction of flow of the hot and cold fluids to being parallel. This should not be regarded as restrictive, for the side walls 46 and 48 could be spaced in the manner shown in FIGS. 2 and 4, if it is so desired.

Figure 4:
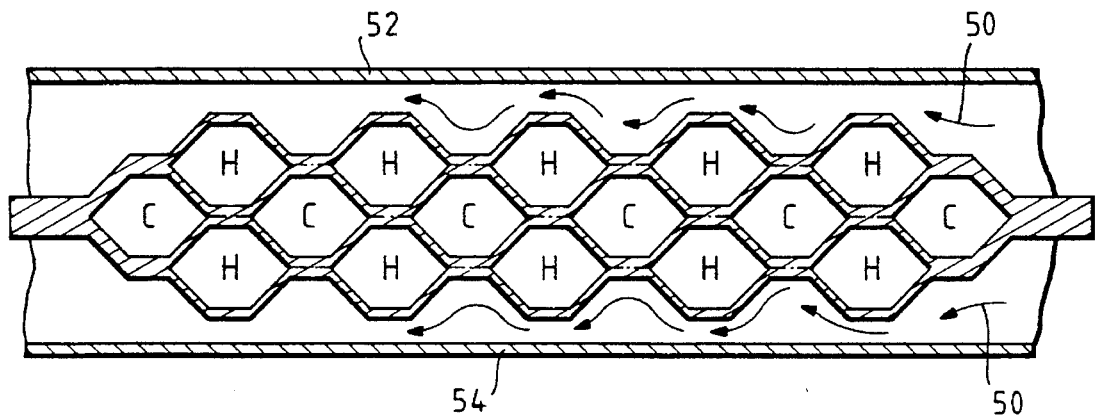

Similarly, although FIG. 4 as depicted enables e.g. a turbulent outer cooling cross flow as indicated by the arrows 50, accompanied by a smooth inner cooling flow marked 'C' in parallel with smooth hot flows, marked 'H', side walls 52 and 54 could be diffusion bonded to the outer tubes, but with consequent restriction in available flow directions and loss of turbulence.

Figure 5:
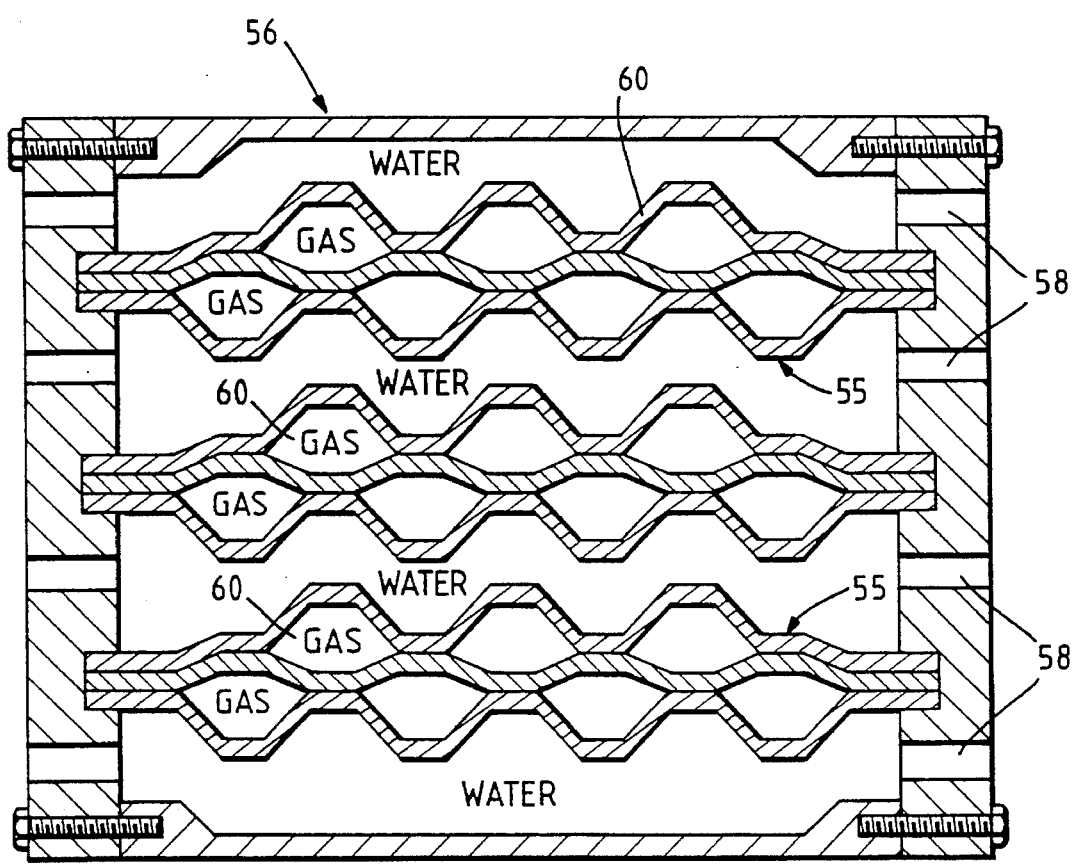
FIG. 5 is a diagrammatic view of a heat exchanger matrix incorporating a panel in accordance with FIG. 3.

Referring to FIG. 5. An array of panels 55 of the kind depicted in FIG. 4 are positioned in a container 56. By way of example, a cooling fluid, say water in this example, is caused to flow via inlets 58 which could be fed via a common manifold (not shown) across both sides of each panel 55 in turbulent manner, whilst a substance to be cooled, say gas, is passed through each tube 60 of each panel 55.

Figure 6:
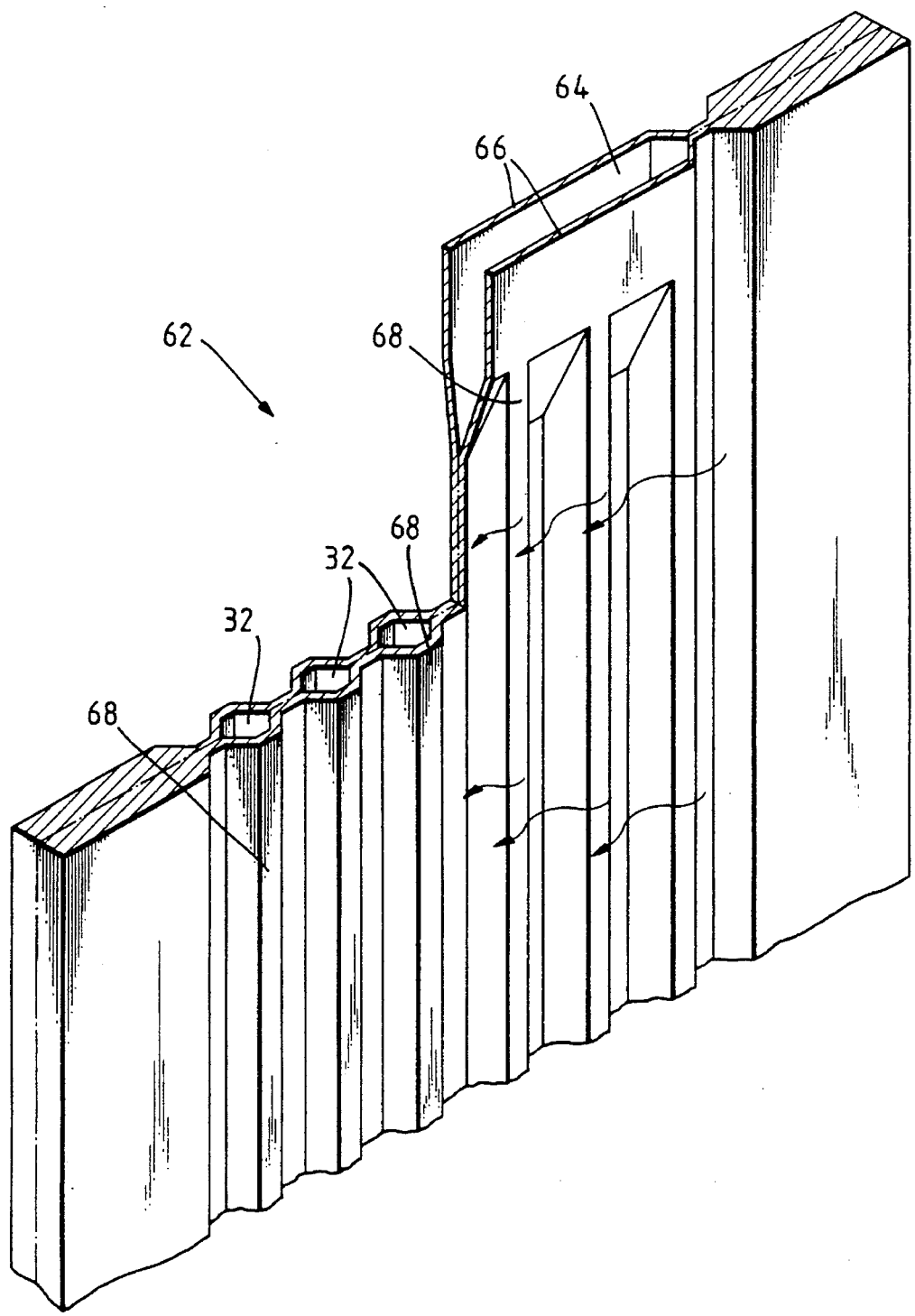
FIG. 6 depicts a panel which has an inlet manifold formed integrally therewith.

Referring now to FIG. 6. A panel 62 is made from two sheets and has the tubular shapes 32 as shown in and described with reference to FIG. 2. It also has what is effectively an inlet manifold 64 formed integrally with and at the same time as the tubes 32. The inlet manifold 64 extends fully across and communicates with the inlet ends of the tubes 32 and is formed by relieving the ends of the dies (not shown, but similar to dies 22,24 in FIG. 1c) so as to provide lands against which the ends 66 of the sheets expand during superplastic forming.

The examples of the present invention which have been described, all consist of assemblies which have been expanded into corrugated forms. Reference will now be made to FIGS. 7 to 11 inclusive, which illustrate a multi-sheet assembly, the intermediate sheet or sheets of which is or are superplastically formed into flow passages which are defined by local protuberances.

Figure 7:
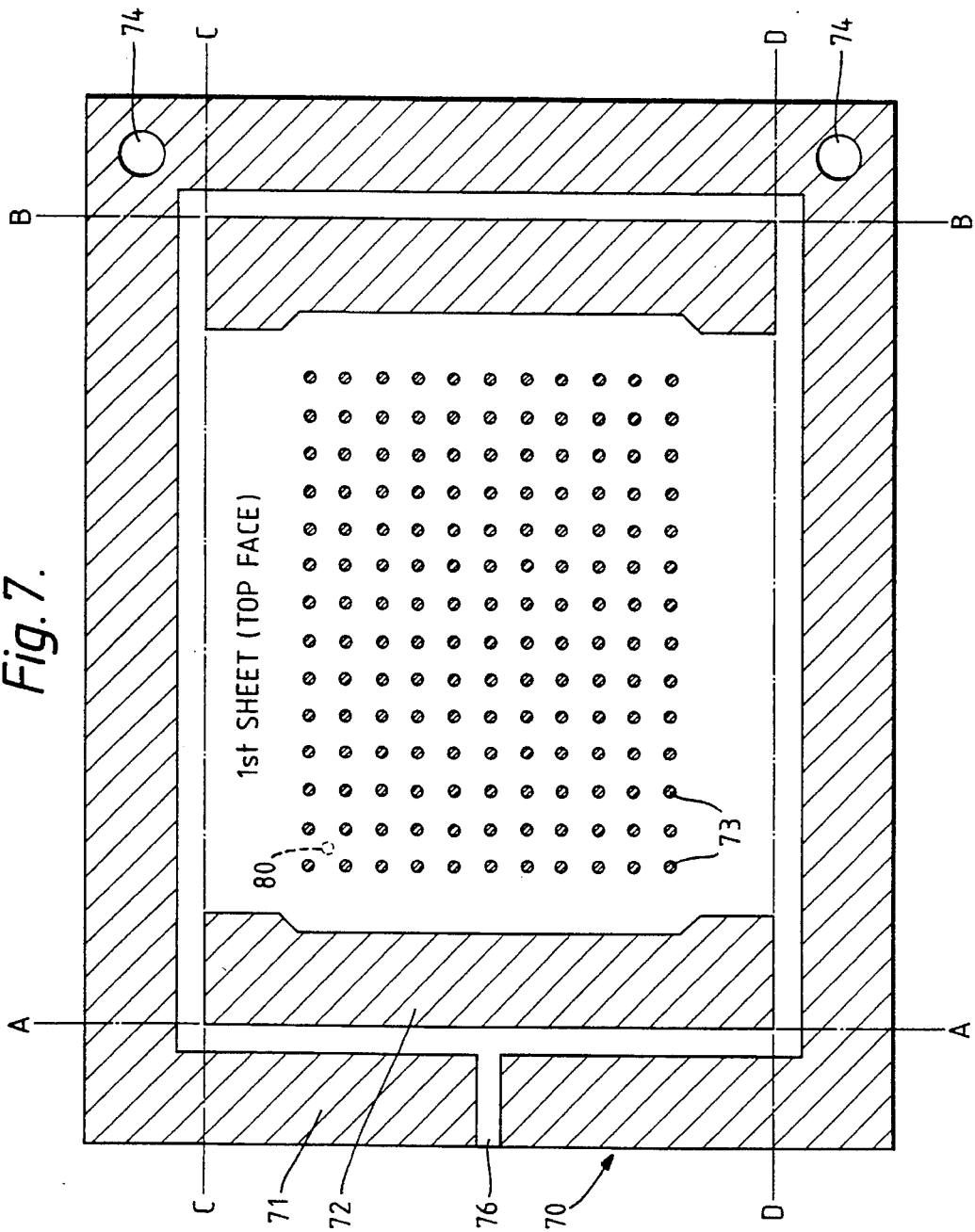
FIGS. 7 to 10 illustrate parts which together provide a heat exchanger panel in accordance with a further embodiment of the present invention.

In FIG. 7 an outer sheet 70 has had a stop off applied to one side of it (here called its top face) so as to leave bare metal which is represented by the shaded areas i.e. outer and inner borders 71,72 respectively and a dot pattern 73. Location dowel holes 74 are provided at each of two corners of the sheet 70.

Figure 11:
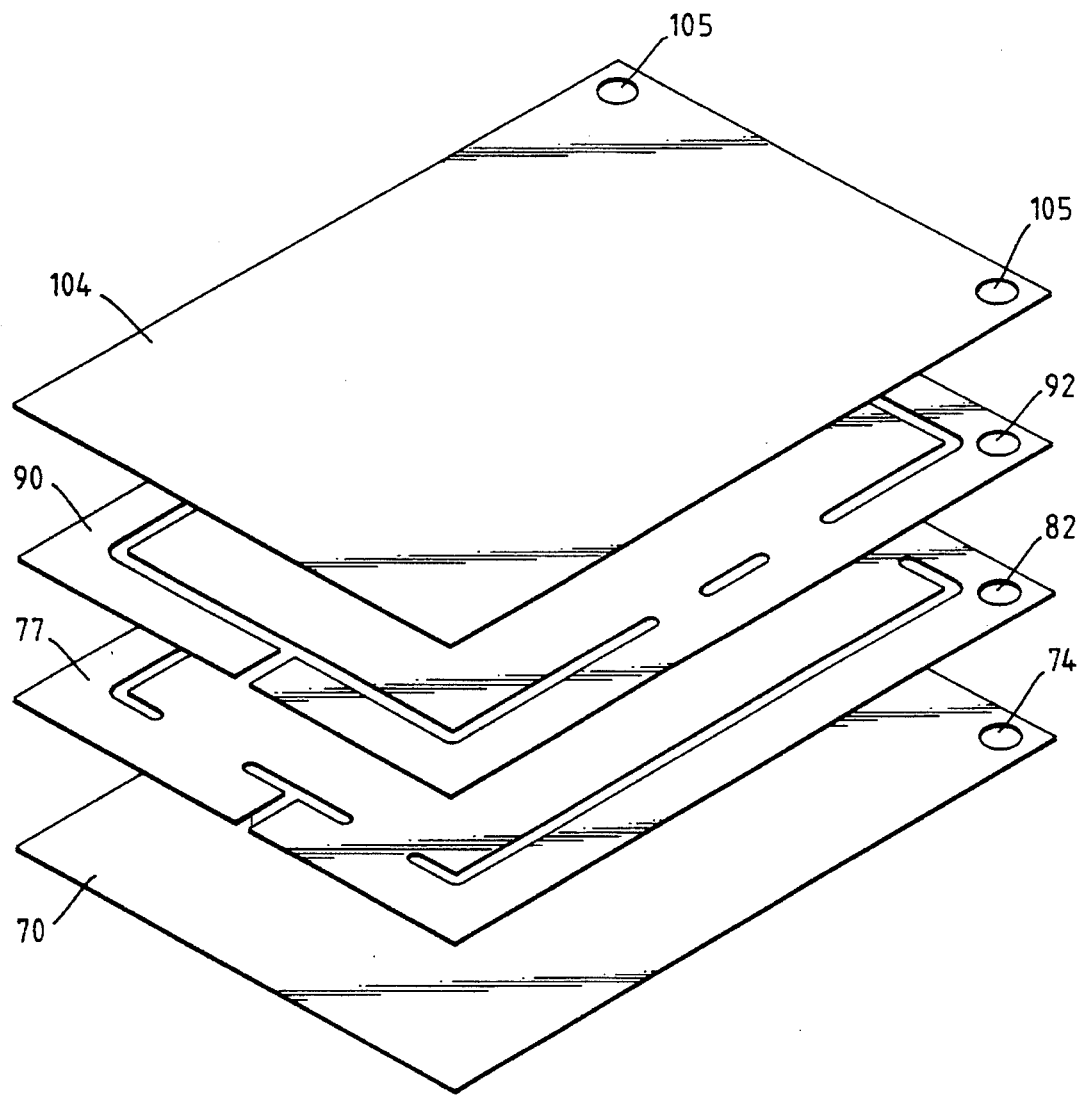
FIG. 11 illustrates the positions of the parts illustrated in FIGS. 7 to 10 with respect to each other.

An area 76 is provided in one of the outer border portions at a place where a pipe will be fixed so as to enable communication with the interior of the eventual assembly, at the areas covered by the stop off as described hereinbefore. Sheet 70 is the bottom sheet in a stack of such sheets as shown in FIG. 11.

Figure 8:
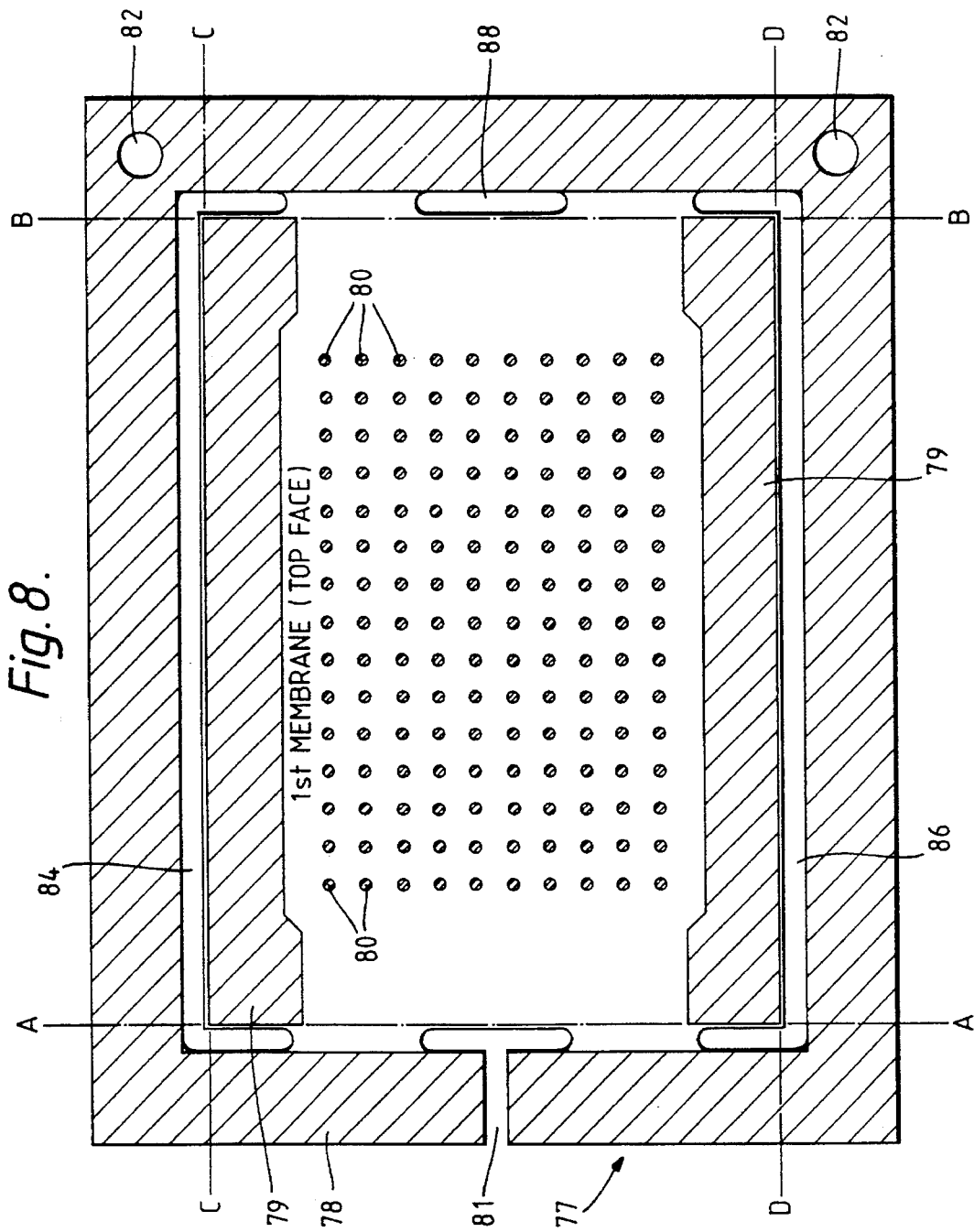

Referring to FIG. 8. A first inner sheet 77 also has a stop off pattern applied to one side (again called the top face) so as to leave bare metal in the shaded areas, i.e. outer and inner borders 78,79 respectively and a dot pattern 80. A pair of dowel holes 82 are provided at each of two corners of the sheet 77 and are sized and spaced so as to be alignable with the dowel holes 74 in sheet 70 (FIG. 7). The spacing of the pattern of dots 80 on the sheet 77 is identical with that of dots 73 on the sheet 70. The position of the pattern as a whole however, with respect to the dowel holes 82, is such that when the sheet 77 is superimposed on the sheet 70 so that the dowel holes 74 and 82 are aligned, each of the dots 80 lies centrally of a respective group of four dots 73 on the sheet 72. Just one dot 80 is superimposed on the sheet 70 in FIG. 7 to illustrate this feature.

It should be noted that whereas the inner borders 72 in FIG. 7 are orientated in one particular manner, the inner borders 79 in FIG. 8 are orientated such as to be normal thereto.

The outer border 78 of sheet 77 also includes an area 81 at which the aforementioned pipe (not shown) will be positioned. The area 81 however is a slot cut into the sheet 77, which accommodates the thickness of the pipe. The slot 81 is branched laterally along the inside edge of the outer border 78, so forming a 'T' shape. Further slots 84 and 86 are cut through the sheet 77 at positions between the outer and inner borders 78,79 and a fourth slot 88 is cut through the sheet 78 at that end opposing the 'T' slot.

Figure 9:
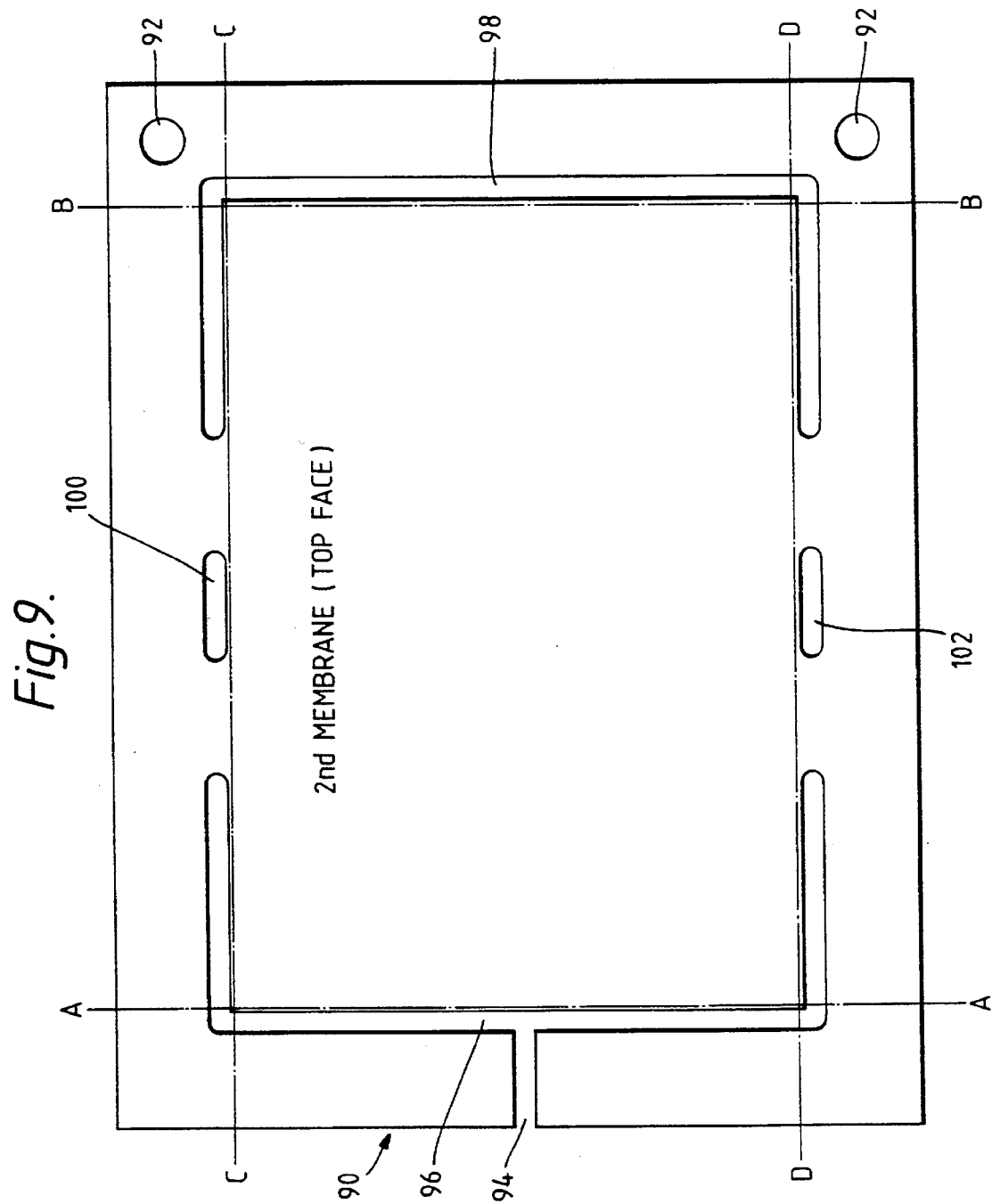

Referring now to FIG. 9. A sheet 90 has a pair of dowel holes 92 at one end, which match the dowel holes 74 and 80 mentioned hereinbefore. The sheet 90 also has a pipe slot 94 which branches laterally of itself, into a 'U' shaped slot 96. A corresponding 'U' shaped slot 98 is provided at the other end of the sheet 90 and two opposing small slots 100 and 102 lie between the respective extremities of the slots 96 and 98.

The sheet 90 does not have any stop off applied to it, for reasons which will be explained hereinafter.

Figure 10:
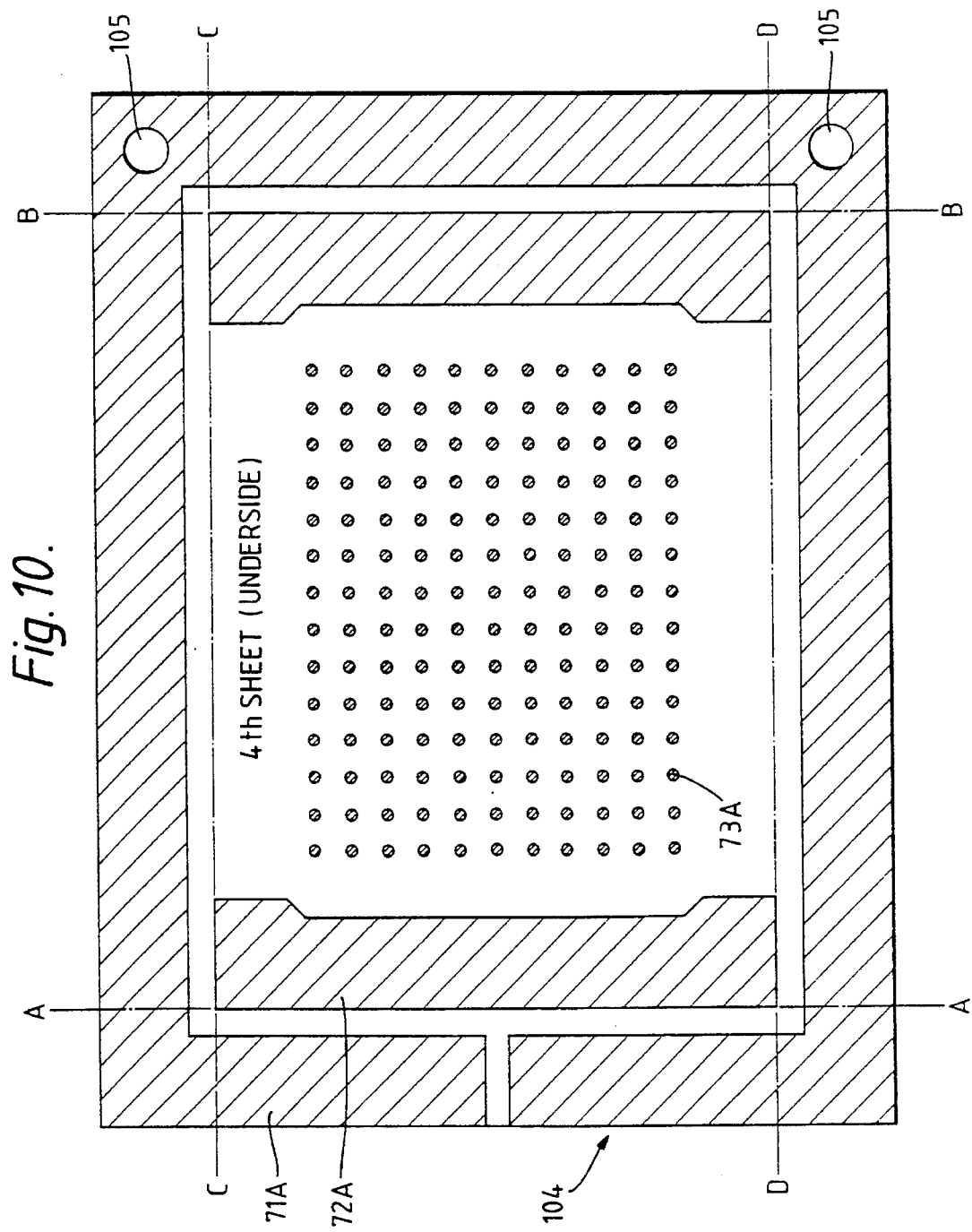

Referring now to FIG. 10. This sheet 104 is a mirror image of the sheet 70 in FIG. 7 in all details and consequently will not be described further except to apply the numerals 105 to the dowel holes and numerals 71A,72A and 73A to the outer and inner borders and the dots respectively, sheet 104 being covered in the appropriate places by the stop off material.

In FIG. 11, the sheets 70,77,90 and 104 are depicted as being positioned with respect to each other so as to achieve a desired assembly relationship therebetween, the dowel holes 74,82,92 and 105 being axially aligned so as to ensure the correct positional relationship when the sheets are placed over a pair of dowels (not shown) which are fixed to a base (not shown).

It will be noted that in FIG. 11, no stop off is shown. This is merely for reasons of clarity. In fact, in practice and as viewed in FIG. 11, stop off as shown in FIG. 7 is applied to the upper surface of sheet 70, stop off as applied to sheet 77 in FIG. 8 is applied to the upper surface of sheet 77. No stop off is applied to sheet 90, but is applied to the underside of sheet 104 in the aforementioned mirror image of the pattern on the upper surface of sheet 70.

On completion of silk screen printing the stop off patterns onto sheets 70,77 and 104, they are assembled along with sheet 90 in the superimposed relationship shown and with their respective dowel holes 74,82,92 and 105 aligned, a pipe (not shown) being included in the position as described hereinbefore.

After welding up and bake-out of stop off solvent, the assembly is purged and evacuated and the pipe (not shown) sealed. Thereafter the assembly is placed in an autoclave, heated and subjected to pressure to achieve diffusion bonding over all of those areas enhanced in FIGS. 7 to 10 by shading.

On completion of the diffusion bonding step, the now integral member is cooled to room temperature and removed from the autoclave. It will be appreciated that sheets 70,77, 90 and 104 are now diffusion bonded around their peripheries at outer borders 71,78 and 71A; after subsequent superplastic forming of the sheets within these outer borders, they will be cut off along lines A—A, B—B, C—C and D—D. Sheets 70 and 77 are also diffusion bonded at inner borders 72 along their side edges as viewed in FIGS. 7 to 10 of the drawings, and as sheet 104 is a mirror image of sheet 70, then sheets 90 and 104 are likewise diffusion bonded along the corresponding side edges. However, sheets 77 and 90 are diffusion bonded at inner borders 79 along their upper and lower edges as viewed in those drawings.

Sheet 70 is also diffusion bonded via its dots 73 to sheet 77, just as sheet 77 is diffusion bonded to sheet 90 via its dots 80, the pattern of which is offset from that of the dots on sheet 70, as explained hereinbefore.

Sheets 90 and 104 are also diffusion bonded via the dots 73A on sheet 104, the pattern of which dots as previously stated are aligned with the dot pattern on sheet 70 in mirror image thereof.

By virtue of the overlap of the diffusion-bonded inner borders 72,79,72A at the corners of the sheets 70,77,90,104, all four sheets will still be bonded at their corners even after the diffusion-bonded outer borders have been cut off upon completion of the superplastic forming operation. This is best seen in FIG. 12 to which reference is now made.

The diffusion bonding of the sheets 70 and 77 at their inner side borders 72 and sheets 90 and 104 at corresponding side borders 72A, enables the structure to be superplastically expanded such that the two pairs of sheets 70,77 and 90,104 move away from each other, to form an inlet manifold for the receipt of a flow of fluid in the direction of arrow 106, and a header (not shown) at the opposing end of the structure.

The diffusion bonding of the inner sheets 77 and 90 along their inner top and bottom edge borders 79, as previously explained will, on the said superplastic forming of the structure, enable sheets 70 and 104 to separate from those inner sheets, to provide a double manifold for fluid flow in the direction of arrows 108 and 110, and a double header (not shown) at the opposing end of the structure.

Figure 12:
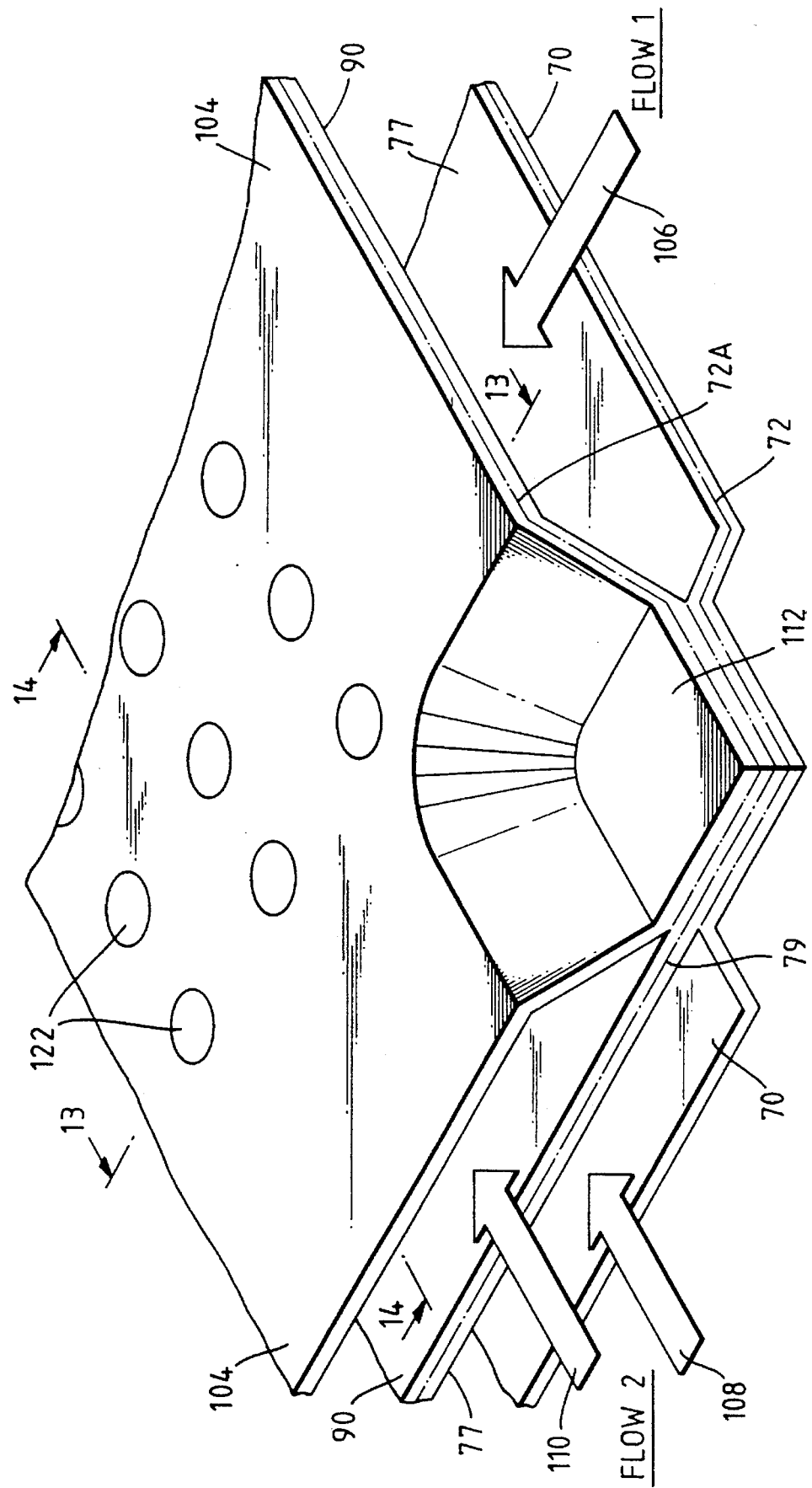
FIG. 12 is a pictorial part view of a heat exchanger panel constructed from the parts of FIGS. 7 to 10.

Each corner 112 of the structure, only one of which corners is shown in FIG. 12, consists of all four sheets bonded together. As stated before, the original interfaces therebetween are shown in chain dotted lines, because after diffusion bonding, there are no interfaces.

As superplastic forming occurs, the portion of the structure which is bounded by the inner diffusion bonded borders will act in the following manner and as illustrated in FIGS. 13 to 16.

Argon gas will seep through the structure penetrating via the stop off and the slots 81,84,86 and 88 (FIG. 8) and 96,98,100 and 102 (FIG. 9).

As internal pressure increases, sheets 70 and 104 move away from sheets 77 and 90 where the stop off has inhibited diffusion bonding. Because of their connections via the bonded dots 73,73A, the two outer sheets 70 and 104 pull local portions of respective sheets 77 and 90 with them.

Sheets 77 and 90 however are bonded together via that pattern of dots 80 which is displaced relatively to the patterns of dots 73,73A on sheets 70 and 104 and consequently, cannot part in those places. There results the formation of a series of local portions of approximately frusto conical form. These are depicted by the numerals 114 and 116 in FIG. 13.

Those places 80 at which sheets 77 and 90 are bonded also resist separation with consequent formation of further portions of approximately frusto conical form. These are indicated in dotted lines and by the numerals 118 and 120 in FIG. 13 and in full lines and the same numerals in FIG. 14.

The formation of the frusto cones 114 and 116 forms a central fluid passage 117, and the formation of frusto cones 118 and 120 forms outer fluid passages 123 and 125.

FIG. 13 also depicts the single inlet manifold into which in operation fluid flows in the direction of the arrow 106, and then passes around the exterior of each abutting pair of frusto cones 118 and 120, in a tortuous path shown by arrows 119 through the centre of the now expanded member.

Referring back to FIG. 12. Where the outer sheets 70 and 104 are bonded by their dot patterns to respective inner sheets 77 and 90, the outer surfaces of the member show "witness" to this i.e. discs 122 are visible to the eye, but cannot be sensed by touch. This is a first indication as to whether diffusion bonding has been achieved.

After superplastic forming the fully formed panel is machined along lines AA,BB,CC, and DD to remove excess material and to expose the manifolds.

Referring specifically to FIG. 14. The double inlet manifold described hereinbefore is depicted, as are the arrows 108 and 110 which indicate the flow of fluid into each of them. The fluid after entry therethrough flows around the frusto cones 114 and 116 as depicted by the further arrows 124, thus bypassing the central passage 117 described with respect to FIG. 13.

On looking at FIG. 12 in conjunction with each of FIGS. 13 and 14, it is clearly seen that the central and outer flows occur in directions normal to each other.

The completed member as illustrated in FIGS. 12 to 14 inclusive constitutes a single heat exchanger panel and any number can be arranged side by side in order to build a heat exchanger matrix which has a desired throughput and cooling efficiency.

Figure 15:
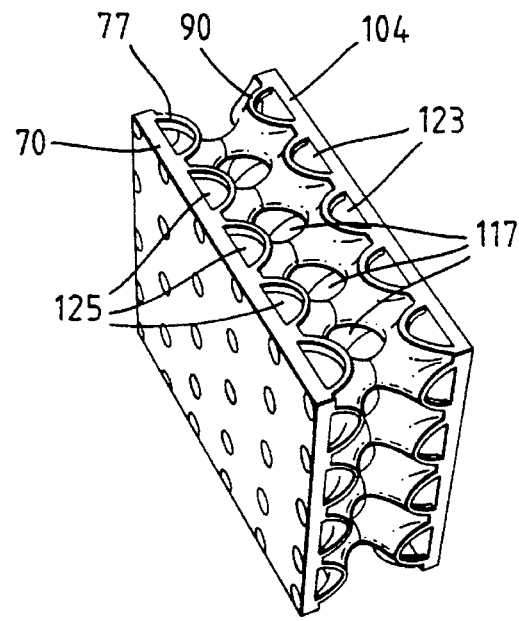
FIGS. 15 and 16 depict three dimensional views of the arrangement in FIGS. 12 to 14.
Figure 16:
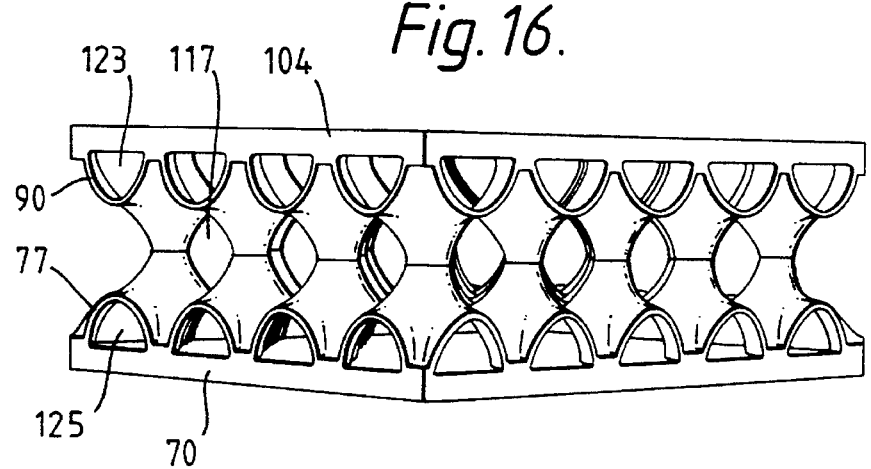

FIGS. 15 and 16 are illustrations of a portion of a panel constructed in accordance with the present invention with reference to FIGS. 12 to 14 inclusive, and clearly show the frusto conical portions formed from the sheets 70,77,90 and 104, and which define the central passage 117 and the outer passages 123 and 125.

Figure 17:
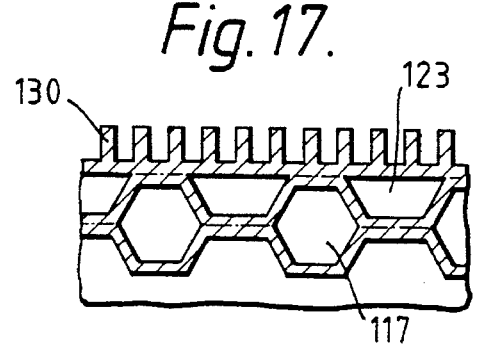
FIG. 17 depicts a further embodiment of the present invention.

The outer skins of the outer panels of all of the assemblies shown herein, may be thicker than the inner skins, to the extent that elongate slots can be machined in their outer surfaces, thus providing elongate fins 130 as depicted in FIG. 17 to further enhance heat exchange capability of the panel.

Whereas the above embodiments have been described as constructed from titanium sheets, it will be evident to the specialist that with appropriate adjustments to processing temperatures and times and appropriate treatments of the faying surfaces of the sheets to encourage diffusion bonding, the same structures could also be produced in other superplastically deformable materials, such as aluminium, stainless steel and nickel alloys.

We claim:

1. A heat exchanger comprising at least two sheets of metal, at least one of the sheets being capable of superplastic extension, the sheets having been joined together by diffusion bonding in selected places to form an integral stack, said at least one sheet having been superplastically expanded away from the at least one other sheet in selected places where they are not diffusion bonded together thereby defining a) main heat exchanger passages for fluid flow, and
    b) heat exchange fluid inlet and outlet means in peripheral portions of the sheets to carry fluid to and from the main heat exchanger passages and wherein said integral stack comprises of at least three sheets of metal, at least the middle sheet in the stack having been superplastically extended.

2. A heat exchanger panel as claimed in claim 1 having a predetermined non-planar external shape, at least one of the outer sheets of the integral stack having been superplastically extended to said predetermined external shape.

3. A heat exchanger panel having an interior structure comprising a plurality of main heat exchange passages for heat exchange fluid flow, first passage means for delivering heat exchange fluid to said heat exchanger passages, second passage means for collecting heat exchange fluid from said heat exchanger passages;

heat exchange fluid inlet and outlet means; said panel comprising of an integral stack of at least two confronting sheets of metal joined together by diffusion bonding at a plurality of sites, at least one of the sheets being capable of superplastic extension and having been superplastically extended away from the at least one other sheet at a further plurality of sites where said confronting sheets are not diffusion bonded together, said interior structure, including said heat exchange fluid inlet and outlet means being completely defined by said sites of diffusion bonding and superplastic extension in which the integral stack comprises at least three sheets of metal, at least the middle sheet in the stack having been superplastically extended.

4. A heat exchanger panel as claimed in claim 3 having a predetermined non-planar external shape, at least one of the outer sheets of the integral stack having been superplastically extended to said predetermined external shape.

5. A heat exchanger panel as claimed in claim 4 or 2 in which both the outer sheets of the integral stack have been superplastically extended to said predetermined external shape.

6. A heat exchanger panel as claimed in claim 1, in which the integral stack has at least one external surface which has been machined to a desired configuration.

7. A heat exchanger comprising a plurality of sheets of metal, at least one of the sheets being capable of superplastic extension, the sheets having been joined together by diffusion bonding in selected places to form an integral stack, said at least one sheet having been superplastically expanded away from the at least one other sheet in selected places where they are not diffusion bonded together thereby defining a) main heat exchanger passages for fluid flow, and
    b) heat exchange fluid inlet and outlet means in peripheral portions of the sheets to carry fluid to and from the main heat exchanger passages and in which the integral stack comprises more than two sheets diffusion bonded together, at least one inner sheet of the stack having at least one aperture therethrough, the at least one aperture being positioned so as to coincide with a site of superplastic extension and in which the integral stack comprises at least three sheets of metal, at least the middle sheet in the stack having been superplastically extended.

* * * * *